US011597082B2

(12) United States Patent
Yi (10) Patent No.: US 11,597,082 B2
(45) Date of Patent: Mar. 7, 2023

(54) DISPATCHING METHOD AND DEVICE, AND NON-TRANSITORY READABLE STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Xu Yi, Beijing (CN)

(73) Assignee: BEIJING JINGDONG QIANSHI TECHNOLOGY CO., LTD, Beijing (CN)

(*) Notice: Subject to any disclaimer, the term of this patent is extended or adjusted under 35 U.S.C. 154(b) by 901 days.

(21) Appl. No.: 16/341,723

(22) PCT Filed: Oct. 12, 2017

(86) PCT No.: PCT/CN2017/105820
§ 371 (c)(1),
(2) Date: Apr. 12, 2019

(87) PCT Pub. No.: WO2018/068743
PCT Pub. Date: Apr. 19, 2018

(65) Prior Publication Data
US 2019/0240834 A1    Aug. 8, 2019

(30) Foreign Application Priority Data
Oct. 13, 2016    (CN) .......................... 201610893830.0

(51) Int. Cl.
B25J 9/16    (2006.01)
B65G 1/137    (2006.01)
(Continued)

(52) U.S. Cl.
CPC ........... *B25J 9/1664* (2013.01); *B25J 9/1661* (2013.01); *B65G 1/1373* (2013.01);
(Continued)

(58) Field of Classification Search
CPC ........ B25J 9/1664; B25J 9/1661; B25J 9/162; B25J 9/1666; B25J 9/1676; B25J 11/008;
(Continued)

(56) References Cited

U.S. PATENT DOCUMENTS 9,069,351 B2    6/2015    Brantmark et al.
2006/0265103 A1   11/2006    Orita
(Continued)

FOREIGN PATENT DOCUMENTS

CN    1521675 A    8/2004
CN    103471596 A    12/2013
(Continued)

OTHER PUBLICATIONS

International Search Report and Written Opinion dated Jan. 18, 2018 in PCT/CN2017/105820, 22 pages (with English translation).
(Continued)

*Primary Examiner* — Abby Y Lin
*Assistant Examiner* — Esvinder Singh
(74) *Attorney, Agent, or Firm* — Oblon, McClelland, Maier & Neustadt, L.L.P.

(57) ABSTRACT

The present disclosure discloses a dispatching method and device, and a non-transitory readable storage medium, and relates to the field of computer technology. The method of the present disclosure includes: obtaining path condition information within a warehouse; calculating pickup time of each candidate robot of a plurality of candidate robots according to a location of the candidate robot and the path
(Continued)

condition information; dispatching a target robot to perform a pickup task according to the pickup time of each candidate robot.

20 Claims, 4 Drawing Sheets

(51) Int. Cl.
  *G05B 19/418* (2006.01)
  *G06Q 10/04* (2012.01)
  *G06Q 10/047* (2023.01)

(52) U.S. Cl.
  CPC ..... *G05B 19/41895* (2013.01); *G06Q 10/047* (2013.01); *G05B 2219/31003* (2013.01); *G05B 2219/31006* (2013.01); *Y02P 90/02* (2015.11)

(58) Field of Classification Search
  CPC ...... B25J 13/088; B25J 13/089; B25J 13/086; B65G 1/1373; B65G 47/1478; B65G 47/90; G05B 19/41895; G05B 2219/31003; G05B 2219/31006; G05B 2219/31277; G05B 19/4061; G05B 2219/31382; G05B 2219/39082; G05B 2219/39091; G05B 2219/40317; G05B 2219/40339; G05B 2219/40476; G05B 2219/40507; G06Q 10/047; G06Q 10/06315; G06Q 10/08; Y02P 90/02; G05D 1/0212; G05D 1/0214; G05D 1/0287; G05D 1/0289; G05D 1/0291
  See application file for complete search history.

(56) References Cited

U.S. PATENT DOCUMENTS

| | | | |
|---|---|---|---|
| 2008/0091301 | A1 | 4/2008 | Brantmark et al. |
| 2014/0025201 | A1* | 1/2014 | Ryu ................. G05D 1/02 700/245 |
| 2015/0302743 | A1* | 10/2015 | Hao ................. G08G 1/096811 701/117 |
| 2017/0316379 | A1* | 11/2017 | Lepek ................ G06Q 10/083 |
| 2018/0067620 | A1* | 3/2018 | Adler ................. H04L 67/42 |
| 2018/0075402 | A1* | 3/2018 | Stadie ................ G06Q 50/28 |
| 2018/0239343 | A1* | 8/2018 | Voorhies ............. G05D 1/0289 |
| 2018/0333847 | A1* | 11/2018 | Ma ................... G05D 1/02 |
| 2021/0221615 | A1* | 7/2021 | Buchmann .......... B65G 1/1375 |

FOREIGN PATENT DOCUMENTS

| | | |
|---|---|---|
| CN | 104809606 A | 7/2015 |
| CN | 105094767 A | 11/2015 |
| CN | 105354641 A | 2/2016 |
| CN | 105446342 A | 3/2016 |
| CN | 105446343 A | 3/2016 |
| EP | 2 499 545 A1 | 9/2012 |
| EP | 1 815 301 B1 | 7/2015 |

OTHER PUBLICATIONS

Combined Office Action and Search Report dated Jun. 21, 2018 in Chinese Patent Application No. 201610893830.0, 21 pages (with English translation and English translation of categories of cited documents).

Office Action dated Nov. 9, 2018 in Chinese Patent Application No. 201610893830.0 (with English translation).

Office Action dated Feb. 3, 2019 in Chinese Patent Application No. 201610893830.0 (with English translation).

* cited by examiner

DISPATCHING METHOD AND DEVICE, AND NON-TRANSITORY READABLE STORAGE MEDIUM

CROSS-REFERENCE

The present application is based on and claims priority to CN Patent Application No. 201610893830.0 filed on Oct. 13, 2016, the disclosure of which is incorporated by reference herein in its entirety.

TECHNICAL FIELD

The present disclosure relates to the field of computer technology, and in particular, to a dispatching method and device, and a non-transitory readable storage medium.

BACKGROUND

With the rapid development of e-commerce, automatic warehouses have been increasingly applied. It is more convenient and efficient to use a robot to store and dispatch a cargo in an unmanned warehouse.

One method known to the inventors is a distance-based dispatching method in an unmanned warehouse, that is, to assign a pickup task of a cargo to a robot closest to the cargo.

SUMMARY

According to an aspect of the present disclosure, a dispatching method is provided. The method comprises: obtaining path condition information within a warehouse; calculating pickup time of each candidate robot of a plurality of candidate robots according to a location of the candidate robot and the path condition information; dispatching a target robot to perform a pickup task according to the pickup time of each candidate robot.

In some embodiments, the calculating pickup time of each candidate robot of a plurality of candidate robots according to a location of the candidate robot and the path condition information comprises: selecting a pickup path of each candidate robot according to the location of the candidate robot and the path condition information; calculating pickup time of the candidate robot according to a length of the pickup path and a walking speed of the candidate robot.

In some embodiments, the path condition information including at least one of travel direction information, obstacle information, and or congestion information of a path; a path is selected as the pickup path of the candidate robot from at least one kind of the following paths: a path by which a travel direction meets the accessibility from the location of the candidate robot to a pickup location; a path without obstacles from the location of the candidate robot to a pickup location; a path without a condition of congestion from the location of the candidate robot to a pickup location.

In some embodiments, the calculating pickup time of each candidate robot of a plurality of candidate robots according to a location of the candidate robot and the path condition information comprises: calculating basic pickup time of the candidate robot to travel each path of at least one path to complete the pickup task according to a length of the each path and a walking speed of the candidate robot; calculating additional pickup time of the candidate robot to address a path problem in the each path according to the path condition information; adding the basic pickup time and the additional pickup time in the each path to obtain total pickup time for the candidate robot in the each path, and selecting the shortest total pickup time from the total pickup time of the candidate robot in the each path as the pickup time of the candidate robot.

In some embodiments, the calculating pickup time of each candidate robot of a plurality of candidate robots according to a location of the candidate robot and the path condition information comprises: selecting the shortest path of at least one path for the candidate robot to complete the pickup task; calculating basic pickup time of the candidate robot to travel the shortest path according to a length of the shortest path and a walking speed of the candidate robot; calculating additional pickup time of the candidate robot to address a path problem in the shortest path according to the path condition information; adding the basic pickup time of the candidate robot in the shortest path and the additional pickup time of the candidate robot in the shortest path to obtain the pickup time of the candidate robot.

In some embodiments, the calculating additional pickup time of the candidate robot to address a path problem in the shortest path according to the path condition information comprises at least one of the following methods: calculating first time by an increased distance to bypass an obstacle path segment or a congestion path segment by the candidate robot divided by the walking speed of the candidate robot, determining increased turning time to bypass an obstacle path segment or a congestion path segment as second time, and determining additional pickup time of the candidate robot in the shortest path from the first time and the second time, in a case where the path condition information includes obstacle information or congestion information of the shortest path; obtaining time to clear obstacles in the shortest path as additional pickup time of the candidate robot in the shortest path, in a case where the path condition information includes obstacle information of the shortest path; obtaining a walking speed of a robot in a congestion path segment, calculating a length of the congestion path segment divided by the walking speed of the candidate robot in the congestion path segment to obtain congestion time, and calculating the length of the congestion path segment divided by a walking speed of the candidate robot in a normal path to obtain normal time, such that a difference between the congestion time and the normal time serves as additional pickup time of the candidate robot in the shortest path, in a case where the path condition information includes congestion information of the shortest path.

In some embodiments, each of the candidate robots obtains the path condition information within the warehouse; the candidate robot calculates the pickup time according to the location and the path condition information; the console dispatches a target robot to perform the pickup task from the pickup time reported by the candidate robot.

In some embodiments, the console selects a target robot having the shortest pickup time to perform the pickup task from candidate robots that report their pickup time within first preset time after the console sends an instruction to the candidate robots to report their pickup time.

In some embodiments, the console sends a dispatching instruction to the target robot, and determines a robot to perform the pickup task from the remaining robots if the console does not receive confirmation information from the target robot within second preset time.

In some embodiments, the method further comprises: the console calculates a length of the shortest pickup path of each of the candidate robots to complete the pickup task according to the location of the candidate robot; the console selects a preset number of robots from the candidate robots according to the length of the shortest pickup path of each candidate robot, and sends the path condition information within the warehouse to the preset number of robots.

According to a further aspect of the present disclosure, a dispatching device is provided. The device comprises: one or more processers; and memory coupled to the processors and storing instructions that when executed by one or more processor, cause the one or more processors to perform one or more operations as follows: obtaining path condition information within a warehouse; calculating pickup time of each candidate robot of a plurality of candidate robots according to a location of the candidate robot and the path condition information; dispatching a target robot to perform a pickup task according to the pickup time of each candidate robot.

In some embodiments, the calculating pickup time of each candidate robot of a plurality of candidate robots according to a location of the candidate robot and the path condition information comprises: selecting a pickup path of each candidate robot according to the location of the candidate robot and the path condition information; calculating pickup time of the candidate robot according to a length of the pickup path and a walking speed of the candidate robot.

In some embodiments, the path condition information including at least one of travel direction information, obstacle information, and or congestion information of a path; a path is selected as the pickup path of the candidate robot from at least one kind of the following paths: a path by which a travel direction meets the accessibility from the location of the candidate robot to a pickup location; a path without obstacles from the location of the candidate robot to a pickup location; a path without a condition of congestion from the location of the candidate robot to a pickup location.

In some embodiments, the calculating pickup time of each candidate robot of a plurality of candidate robots according to a location of the candidate robot and the path condition information comprises: calculating basic pickup time of the candidate robot to travel each path of at least one path to complete the pickup task according to a length of the each path and a walking speed of the candidate robot; calculating additional pickup time of the candidate robot to address a path problem in the each path according to the path condition information; adding the basic pickup time and the additional pickup time in the each path to obtain total pickup time for the candidate robot in the each path, and selecting the shortest total pickup time from the total pickup time of the candidate robot in the each path as the pickup time of the candidate robot.

In some embodiments, the calculating pickup time of each candidate robot of a plurality of candidate robots according to a location of the candidate robot and the path condition information comprises: selecting the shortest path of at least one path for the candidate robot to complete the pickup task; calculating basic pickup time of the candidate robot to travel the shortest path according to a length of the shortest path and a walking speed of the candidate robot; calculating additional pickup time of the candidate robot to address a path problem in the shortest path according to the path condition information; adding the basic pickup time of the candidate robot in the shortest path and the additional pickup time of the candidate robot in the shortest path to obtain the pickup time of the candidate robot.

In some embodiments, the calculating additional pickup time of the candidate robot to address a path problem in the shortest path according to the path condition information comprises at least one of the following methods: calculating first time by an increased distance to bypass an obstacle path segment or a congestion path segment by the candidate robot divided by the walking speed of the candidate robot, determining increased turning time to bypass an obstacle path segment or a congestion path segment as second time, and determining additional pickup time of the candidate robot in the shortest path from the first time and the second time, in a case where the path condition information includes obstacle information or congestion information of the shortest path; obtaining time to clear obstacles in the shortest path as additional pickup time of the candidate robot in the shortest path, in a case where the path condition information includes obstacle information of the shortest path; obtaining a walking speed of a robot in a congestion path segment, calculating a length of the congestion path segment divided by the walking speed of the candidate robot in the congestion path segment to obtain congestion time, and calculating the length of the congestion path segment divided by a walking speed of the candidate robot in a normal path to obtain normal time, such that a difference between the congestion time and the normal time serves as additional pickup time of the candidate robot in the shortest path, in a case where the path condition information includes congestion information of the shortest path.

In some embodiments, one or more processors disposed within the candidate robot performing operations comprises: obtaining the path condition information within the warehouse; calculating the pickup time according to the location and the path condition information; one or more processors disposed within a console which performing operations comprises: dispatching a target robot to perform the pickup task from the pickup time reported by the candidate robot.

In some embodiments, the one or more processors disposed within a console which performing operations comprises: selecting a target robot having the shortest pickup time to perform the pickup task from candidate robots that report their pickup time within first preset time after the console sends an instruction to the candidate robots to report their pickup time.

In some embodiments, the one or more processors disposed within a console which performing operations further comprises: calculating a length of the shortest pickup path of each of the candidate robots to complete the pickup task according to the location of the candidate robot; selecting a preset number of robots from the candidate robots according to the length of the shortest pickup path of each candidate robot, and sending the path condition information within the warehouse to the preset number of robots.

According to still another aspect of the present disclosure, a non-transitory readable storage medium storing a computer program is provided. When the computer program is executed by a processor, causes the processor to perform one or more steps as follows: obtaining path condition information within a warehouse; calculating pickup time of each candidate robot of a plurality of candidate robots according to a location of the candidate robot and the path condition information; dispatching a target robot to perform a pickup task according to the pickup time of each candidate robot.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings described herein are used to provide a further understanding of the present invention and constitute a part of the present application. The illustrative embodiments of the present invention as well as the illustrations thereof, which are used for explaining the present invention, do not constitute improper definitions on the present invention. In the drawings.

DETAILED DESCRIPTION

Next, the technical solution in the embodiments of the present disclosure will be explicitly and completely described in combination with the drawings in the embodiments of the present disclosure. Apparently, the described embodiments are merely part of the embodiments of the present disclosure, rather than all the embodiments. The following descriptions of at least one exemplary embodiment which are in fact merely descriptive, by no means serve as any delimitation on the present disclosure as well as its application or use. On the basis of the embodiments of the present disclosure, all the other embodiments acquired by a person skilled in the art on the premise that no inventive effort is involved fall into the scope protected by the present disclosure.

The inventors have found that robots are very likely to encounter obstacles or congestion during walking, and a robot closer to the pickup location may need to take a longer time to reach the pickup location. Therefore, it is not preferred to use distance as a basis for dispatching, as the pickup efficiency may be relatively low.

In view of the problem that the pickup dispatch of robots in an unmanned warehouse on the basis of distances between the robots and a pickup location results in long pickup time and unsatisfactory pickup efficiency in the relevant art, the present solution is proposed.

The dispatching devices in the embodiments of the present disclosure may each be implemented by respective calculation devices or computer systems, which will be described below in conjunction with FIGS. 1 and 2.

Figure 1:
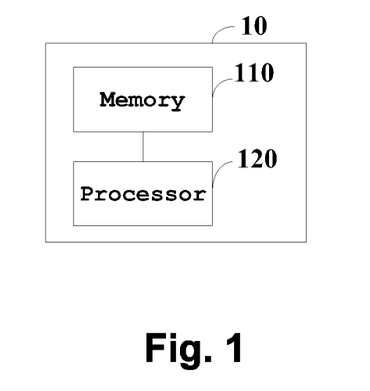
FIG. 1 shows a schematic structural view of a dispatching device according to some embodiments of the present disclosure.

FIG. 1 is a structural view according to some embodiments of the dispatching device according to the present disclosure. As shown in FIG. 1, the device 10 of the embodiment comprises: a memory 110; a processor 120 coupled to the memory 110, wherein the processor 120 is configured to execute instructions stored in the memory 110 that cause the processer to perform the dispatching method according to any several embodiments of the present disclosure.

The memory 110 may include, for example, a system memory, a fixed non-volatile storage medium, and the like. The system memory stores, for example, an operation system, an application program, a boot loader, a database, and other programs.

Figure 2:
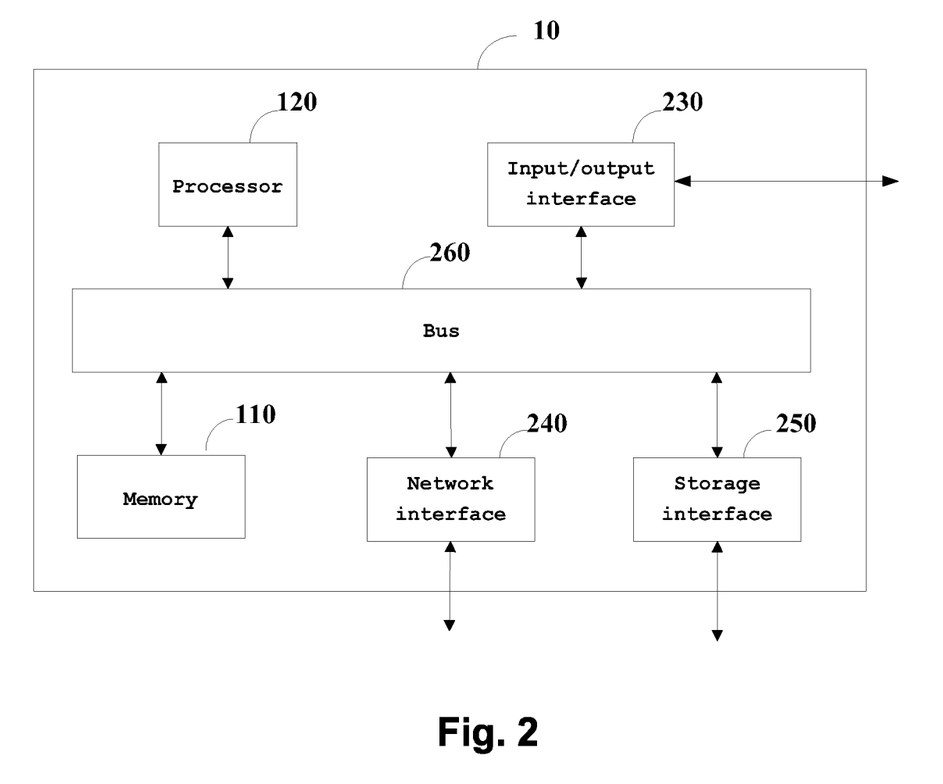
FIG. 2 shows a schematic structural view of a dispatching device according to some embodiments of the present disclosure.

FIG. 2 is a structural view according to other embodiments of the dispatching device according to the present disclosure. As shown in FIG. 2, the device 10 of the embodiment comprises: a memory 110; and a processor 120, and further comprises an input/output interface 230, a network interface 240, a storage interface 250, and the like. These interfaces 230, 240, 250 as well as the memory 110 and the processor 120 there between may be connected, for example, via a bus 260. Wherein, the input/output interface 230 provides a connection interface for input/output devices such as a display, a mouse, a keyboard, and a touch screen. The network interface 240 provides a connection interface for various networked devices, for example, it may be connected to a database server or a cloud storage server and the like. The storage interface 250 provides a connection interface for an external storage device such as an SD card or a USB flash disk.

A dispatching method according to some embodiments of the present disclosure will be described below with reference to FIGS. 3 to 4.

Figure 3:
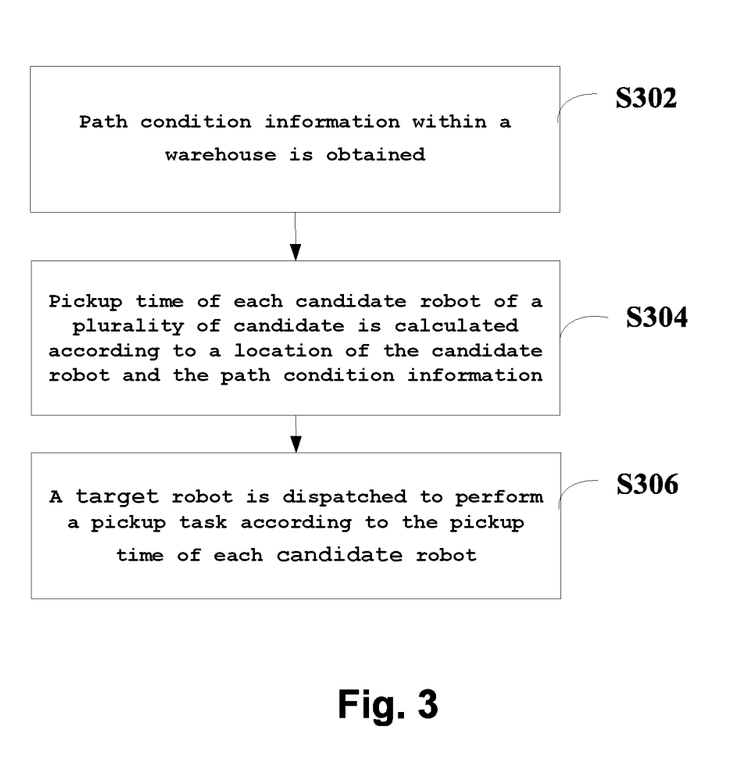
FIG. 3 shows a schematic flow chart of a dispatching method according to some embodiments of the present disclosure.

FIG. 3 shows a flow chart of a dispatching method according to some embodiments of the present disclosure. As shown in FIG. 3, the method comprises: steps S302 to S306.

At step S302, path condition information within a warehouse is obtained.

The path condition information includes, for example, at least one of travel direction information, obstacle information, and congestion information of a path. The travel direction information of the path is pre-planned. For example, some paths are one-way paths. The obstacle information of the path, for example, may be reported by a robot when the robot encounters an obstacle (for example a cargo falls off) or detected by a detection device such as a camera disposed within the warehouse. The congestion information of the path can be obtained by monitoring the heartbeat of a robot when walking. For example, it is determined that congestion is encountered when the walking heartbeat of the robot is lower than a threshold. Or the congestion information of the path can be reported by a robot, or detected by a detection device such as a camera disposed within the warehouse.

The dispatching device may store a map of the warehouse and the path condition information of each path.

At step S304, pickup time of each candidate robot of a plurality of candidate is calculated according to a location of the candidate robot and the path condition information.

The pickup time of the candidate robot is the time required for the candidate robot to arrive at a pickup location to pick up a cargo and reach a designated target location to complete a pickup task. The pickup time of the candidate robot is determined with reference to the path condition information. It is possible to select a pickup path from paths without problem and calculate the pickup time directly. It is also possible to add the additional pickup time for addressing a path problem and the basic pickup time of the candidate robot by normal walking to obtain the pickup time. The specific calculation method will be described later.

At step S306, a target robot is dispatched to perform a pickup task according to the pickup time of each candidate robot.

For example, the pickup time of each candidate robot within the warehouse to complete the pickup task is calculated, and the candidate robot with the shortest pickup time is selected as the target robot to perform the pickup task.

In the above embodiment, pickup time of a candidate robot is determined with reference to a location of the candidate robot and path condition information of each path within a warehouse, and a target robot is determined to perform a pickup task according to the pickup time, so that a target robot is no longer dispatched only on the basis of distance. Thereby, the present disclosure reduces the probability to select a target robot with a closer distance to the pickup location but taking a longer pickup time to perform the pickup task, and improves the pickup efficiency.

The present disclosure also provides several exemplary implementation methods for determining pickup time of each candidate robot in step S304.

In some embodiments, for each candidate robot, a pickup path of the candidate robot is selected according to the location of the candidate robot and the path condition information. And pickup time of the candidate robot is determined according to a length of the pickup path and a walking speed of the candidate robot.

Alternatively, in a case where the path condition information includes travel direction information of a path, a path by which a travel direction meets the accessibility from the location of the candidate robot to a pickup location is selected as a pickup path. For example, considering that the candidate robot cannot arrive at the pickup location in a travel direction of some one-way paths, such one-way paths are not selected as a pickup path. Alternatively, in a case where the path condition information includes obstacle information of a path, a pickup path is selected from the paths without obstacles from the location of the candidate robot to a pickup location. Alternatively, in a case where the path condition information includes congestion information of a path, a pickup path is selected from the paths without congestion from the location of the candidate robot to a pickup location.

It is possible to select a pickup path by applying an algorithm for solving the optimal path problem in the related art, which will not be repeated here. For example, if there are several paths by which travel directions meet the accessibility from the location of the candidate robots to the pickup location, without obstacles, and without congestion, the shortest path will be selected from the several paths.

According to the methods of the above embodiments, the optimal pickup path is planned for the candidate robot according to the condition information of the paths, and the paths with a path problem are not selected to improve the pickup efficiency.

In some embodiments, for each candidate robot, the shortest path of at least one path for the candidate robot to complete the pickup task is selected. Basic pickup time of the candidate robot to travel the shortest path is determined from a length of the shortest path and a walking speed of the candidate robot. Additional pickup time of the candidate robot to address a path problem in the shortest path is determined from the path condition information. And the basic pickup time of the candidate robot in the shortest path and the additional pickup time of the candidate robot in the shortest path are added to obtain the pickup time of the candidate robot.

In the methods of the above embodiments, considering the additional pickup time to address a path problem, the pickup time of each candidate robot in the corresponding shortest path is calculated, and the candidate robot that performs the pickup task with the shortest pickup time is selected therefrom. Thereby, the methods of the above embodiments improve the pickup efficiency.

The above two embodiments may be used in combination. In the first embodiment, selecting a path without a problem as the pickup path may increase the length of the pickup path, and further increase the pickup time. In the second embodiment, waiting to address a path problem when there is a problem in the path may increase the pickup time. The methods in the above two embodiments may be applied simultaneously for determining the pickup time of the candidate robot, and the shorter pickup time is selected from the pickup time of the candidate robot obtained according to the above two embodiments as the pickup time.

In some embodiments, basic pickup time of the candidate robot to travel each path of at least one path is calculated according to a length of each path to complete the pickup task by the candidate robot and a walking speed of the candidate robot. An additional pickup time of the candidate robot to address a path problem in each path is calculated according to the path condition information. And the basic pickup time of the candidate robot in each path and the additional pickup time of the candidate robot in each path are added to obtain a total pickup time of the candidate robot in each path. And the shortest total pickup time is selected from the total pickup time of the candidate robot in each path as pickup time of the candidate robot.

Alternatively, various possible paths are planned for a candidate robot to arrive at the pickup location to pick up the cargo from the location at which the candidate robot is situated and then deliver the cargo to a designated target location, and basic pickup time for the candidate robot to walk in such paths is respectively calculated. Some paths may have problems like obstacles, for example cargo fall-off, or congestion. The time to address these path problems is taken as the additional pickup time. Finally, the total pickup time of the candidate robot in each path is obtained, and the path with the shortest total pickup time therein is selected as the pickup path, and the total pickup time in the path is the pickup time.

In the methods of the above embodiments, considering the additional pickup time to address a path problem, the total pickup time consumed by the candidate robot in various possible pickup paths is determined, and the shortest total pickup time is selected as the pickup time of the candidate robot. Thereby, the methods of the above embodiments improve the pickup efficiency by obtaining the pickup time of each candidate robot, and then selecting the candidate robot to perform a pickup task therefrom.

The additional pickup time in the foregoing embodiments is obtained, for example, by the following methods.

(1) In a case where the path condition information includes obstacle information or congestion information of a path, first time is calculated by an increased distance to bypass an obstacle path segment or a congestion path segment by the candidate robot divided by the walking speed of the candidate robot, and increased turning time to bypass an obstacle path segment or a congestion path segment is determined as second time, additional pickup time of the candidate robot in the path is determined from the first time and the second time. When there are obstacles or congestion in the path, it is possible to choose to detour, with the increased time by detouring as the additional pickup time.

(2) In a case where the path condition information includes obstacle information of a path, time to clear obstacles in the path is obtained as additional pickup time of the candidate robot in the path. For example, when a cargo falls off, the candidate robot may obtain from the console the time required to handle the cargo that falls off, and the candidate robot takes the time to wait for handling the cargo that falls off as the additional pickup time in the path.

(3) In a case where the path condition information includes congestion information of a path, a walking speed of a robot in a congestion path segment is obtained. A length of the congestion path segment is divided by the walking speed of the robot in the congestion path segment to obtain congestion time. And the length of the congestion path segment is divided by a walking speed of the candidate robot in a normal path to obtain normal time. A difference between the congestion time and the normal time serves as additional pickup time of the candidate robot in the path.

Each robot when walking may report a walking speed, that is, a heartbeat, in real time. The candidate robot may obtain from the console a walking speed of a robot in the congestion path segment and a length of the congestion path segment, and calculate the increased time by walking at a congestion speed relative to walking at a normal speed through the congestion path segment, with the increased time as the additional pickup time.

The dispatching method according to the present disclosure may be performed by each candidate robot or by a console, and may also be jointly performed by the candidate robots cooperating with a console. When the method is performed by each candidate robot, the candidate robot calculates the pickup time of the present candidate robot according to the path condition information, and obtains the pickup time of other candidate robots at the same time. In a case where the pickup time of the present candidate robot is the shortest, the pickup task is automatically performed. When the method is performed by a console, the console may calculate the pickup time of each candidate robot according to the path condition information, and select the candidate robot with the shortest pickup time to perform the pickup task.

The dispatching method that is jointly performed by candidate robots cooperating with a console according to some embodiments of the present disclosure will be described below in conjunction with FIG. 4.

Figure 4:
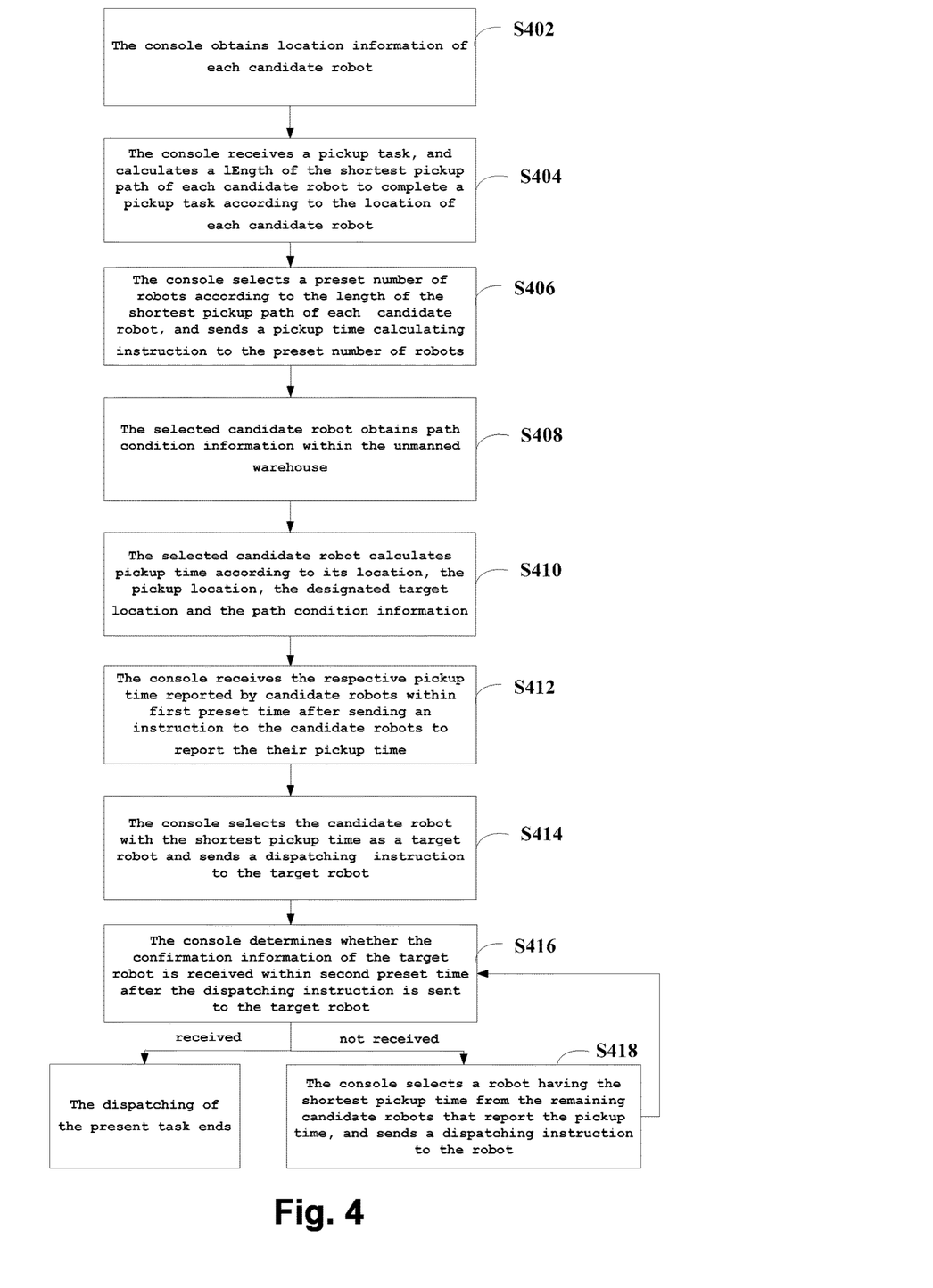
FIG. 4 shows a schematic flow chart of a dispatching method according to some embodiments of the present disclosure.

FIG. 4 shows a flow chart of a dispatching method according to some embodiments of the present disclosure. As shown in FIG. 4, the method comprises: steps S402 to S418.

At step S402, the console obtains location information of each candidate robot.

The candidate robot may report own location information to the console after startup.

At step S404, the console receives a pickup task, and calculates a length of the shortest pickup path of each candidate robot to complete a pickup task according to the location of each candidate robot.

The console calculates the length of the shortest pickup path for each candidate robot to arrive at the pickup shelf to pick up a cargo and deliver the cargo to a designated target location, without having to consider the path condition information at this time.

At step S406, the console selects a preset number of candidate robots according to the length of the shortest pickup path of each candidate robot, and sends a pickup time calculating instruction to the preset number of candidate robots. The pickup time calculating instruction includes a pickup location and a designated target location.

The console may sequence the candidate robots according to the lengths of their shortest pickup paths in an incremental manner, and select a preset number of candidate robots from the top of the sequence.

At step S408, the selected candidate robot obtains path condition information within the unmanned warehouse.

The path condition information may be stored in the console or separately stored in a path condition server.

At step S410, the selected candidate robot calculates pickup time according to its location, the pickup location, the designated target location and the path condition information.

Refer to the above embodiments for the methods of calculating pickup time.

At step S412, the console receives the respective pickup time reported by the candidate robots within first preset time after sending an instruction to the candidate robots to report their pickup time.

For example, the console sends an instruction to the candidate robots 1 to 5 to report their pickup time, and sets a timer to 30 seconds. When the timing of the timer expires, the console receives the pickup time of 49 seconds reported by the candidate robot 1, the pickup time of 73 seconds reported by the candidate robot 2, and the pickup time of 45 seconds reported by the candidate robot 3. The pickup time of the candidate robot 4 and the candidate robot 5 is not received. The pickup time of the candidate robot 5 is received 40 seconds after the instruction is sent, and at this time the candidate robot 5 is no longer considered. The console stores the received pickup time of the candidate robots.

At step S414, the console selects the candidate robot with the shortest pickup time as a target robot and sends a dispatching instruction to the target robot.

At step S416, the console determines whether the confirmation information of the target robot is received within second preset time after the dispatching instruction is sent to the target robot. If the confirmation information is received, the dispatching of the present task ends, and the target robot starts to perform the pickup task. If the confirmation information is not received, the step S418 is performed.

At step S418, the console selects a robot having the shortest pickup time from the remaining candidate robots that report the pickup time, and sends a dispatching instruction to the robot. Moreover, the steps S416 to S418 are repeatedly performed.

For example, the console selects the robot 3 to perform the pickup task according to the pickup time, sends a dispatching instruction to the robot 3, and sets the timer to 10 seconds. If the confirmation information of the robot 3 is not received after the time expires in 10 seconds, the robot 1 is selected from the robots 1 and 2 to perform the pickup task. If the confirmation information of the robot 1 is received within 10 seconds after the dispatching instruction is sent, by this, the dispatching of the present task is completed. The console may also send a dispatching cancelling instruction to the robot 3 that does not return the confirmation information within preset time.

In the methods of the above embodiments, the console receives the pickup time reported by the robots within preset time, and reduces the probability of selecting a robot that is likely malfunctioned in communication as the pickup robot. Further, in the related art, the pickup robot is directly selected by the console. It is likely that the selected robot is malfunctioned in communication so that the dispatching instruction cannot be received, which results in that the console needs to recalculate and select the pickup robot, thereby reducing the efficiency. In the above embodiments, the pickup time is reported by each robot, thereby reducing the probability that the console selects a robot that is malfunctioned in communication. Further, the interaction of the dispatching instruction and the confirmation between the console and the robot further ensured that the selected robot is in a normal operational condition, thereby improving the overall dispatching efficiency of the system.

According to another aspect of the present disclosure, there is also provided a dispatching device, which will be described below in conjunction with FIG. 5.

Figure 5:
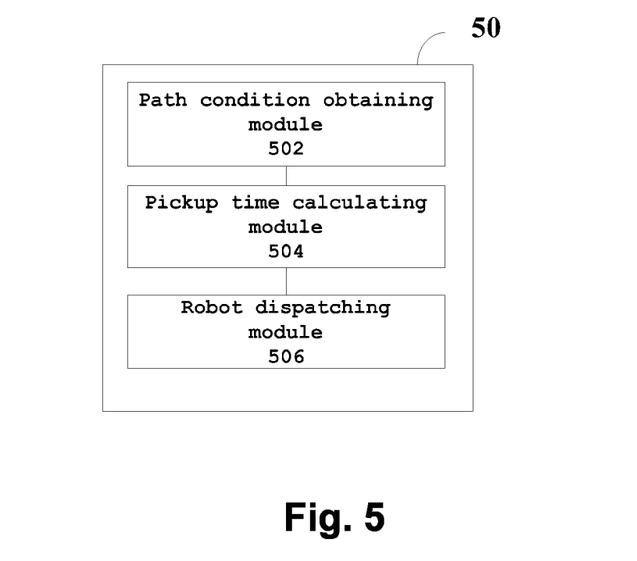
FIG. 5 shows a schematic structural view of a dispatching device according to some embodiments of the present disclosure.

FIG. 5 is a structural view according to some embodiments of the dispatching device according to the present disclosure. As shown in FIG. 5, the dispatching device 50 comprises: a path condition obtaining module 502, a pickup time calculating module 504, and a robot dispatching module 506.

The path condition obtaining module 502 is configured to obtain path condition information within a warehouse. For example, the path condition obtaining module 502 may perform the step S302 in the above embodiments.

The path condition information includes at least one of travel direction information, obstacle information, and congestion information of a path.

The pickup time calculating module 504 is configured to calculate pickup time of each candidate robot of a plurality of candidate robots according to a location of the candidate robot and the path condition information. For example, the pickup time calculating module 504 may perform the step S304 in the above embodiments.

The robot dispatching module 506 is configured to dispatch a target robot to perform a pickup task according to the pickup time of each candidate robot. For example, the robot dispatching module 506 may perform the step S306 in the above embodiments.

Wherein, the pickup time calculating module 504 may have the following several exemplary implementations.

In some embodiments, the pickup time calculating module 504 is configured to a pickup path of each candidate robot according to the location of the candidate robot and the path condition information, and pickup time of the candidate robot according to a length of the pickup path and a walking speed of the candidate robot.

Alternatively, the pickup time calculating module 504 is configured to select a path as a pickup path of the candidate robot from at least one kind of the following paths: a path by which a travel direction meets the accessibility from the location of the candidate robot to a pickup location; a path without obstacles from the location of the candidate robot to a pickup location; a path without a condition of congestion from the location of the candidate robot to a pickup location.

In some embodiments, the pickup time calculating module 504 is configured to calculate basic pickup time of the candidate robot to travel each path of at least one path to complete the pickup task according to a length of the each path and a walking speed of the candidate robot; calculate additional pickup time of the candidate robot to address a path problem in the each path according to the path condition information; and add the basic pickup time and the additional pickup time in the each path to obtain total pickup time for the candidate robot in the each path, and selecting the shortest total pickup time from the total pickup time of the candidate robot in the each path as the pickup time of the candidate robot.

In some embodiments, the pickup time calculating module 504 is configured to select the shortest path of at least one path for the candidate robot to complete the pickup task; calculate basic pickup time of the candidate robot to travel the shortest path according to a length of the shortest path and a walking speed of the candidate robot; calculate additional pickup time of the candidate robot to address a path problem in the shortest path according to the path condition information; and add the basic pickup time of the candidate robot in the shortest path and the additional pickup time of the candidate robot in the shortest path to obtain the pickup time of the candidate robot.

In the above embodiments, alternatively, the pickup time calculating module 504 may be configured to calculate first time by an increased distance to bypass an obstacle path segment or a congestion path segment by the candidate robot divided by the walking speed of the candidate robot, determine increased turning time to bypass an obstacle path segment or a congestion path segment as second time, and determine additional pickup time of the candidate robot in the shortest path from the first time and the second time, in a case where the path condition information includes obstacle information or congestion information of the shortest path.

Alternatively, the pickup time calculating module 504 may be configured to obtain time to clear obstacles in the shortest path as additional pickup time of the candidate robot in the shortest path, in a case where the path condition information includes obstacle information of the shortest path.

Alternatively, the pickup time calculating module 504 may be configured to obtain a walking speed of a robot in a congestion path segment, calculate a length of the congestion path segment divided by the walking speed of the candidate robot in the congestion path segment to obtain congestion time, and calculate the length of the congestion path segment divided by a walking speed of the candidate robot in a normal path to obtain normal time, such that a difference between the congestion time and the normal time serves as additional pickup time of the candidate robot in the shortest path, in a case where the path condition information includes congestion information of the shortest path.

Each of the modules in the various embodiments described above can be implemented by a processor of the device performing a corresponding action.

The dispatching device 50 according to the present disclosure may have different configuration manners, may be separately disposed within the robot or the console, and may also be disposed within the robot and the console respectively, which will be described below in conjunction with FIG. 6.

Figure 6:
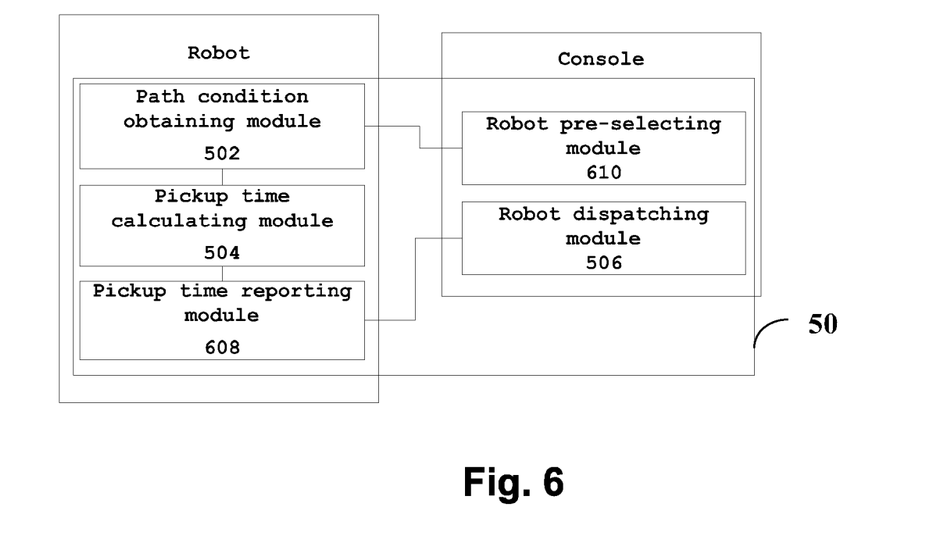
FIG. 6 shows a schematic structural view of a dispatching device according to some embodiments of the present disclosure.

FIG. 6 is a structural view according to some embodiments of the dispatching device according to the present disclosure. As shown in FIG. 6, the path condition obtaining module 502 and the pickup time calculating module 504 are disposed within the candidate robot, and the robot dispatching module 506 is disposed within the console.

The dispatching device 50 further comprises: a pickup time reporting module 608 disposed within the candidate robot and configured to report pickup time of the candidate robot to the console.

Alternatively, the robot dispatching module 506 is configured to select target robot having the shortest pickup time to perform the pickup task from candidate robots that report their pickup time within first preset time after the console sends an instruction to the candidate robots to report their pickup time he console sends a pickup time calculating instruction to the robots.

Alternatively, the robot dispatching module 506 is configured to send a dispatching instruction to the target robot, and determines a robot to perform the pickup task from the remaining robots if the console does not receive confirmation information from the target robot within second preset time.

The dispatching device 50 further may further comprise: a robot pre-selecting module 610 disposed on the console, and configured to a length of the shortest pickup path of each of the candidate robots to complete the pickup task according to the location of the candidate robot, and select a preset number of robots from the candidate robots according to the length of the shortest pickup path of each candidate robot, and sends the path condition information within the warehouse to the preset number of robots.

Each of the modules in the various embodiments described above can be implemented by a processor of the device performing a corresponding action.

The present disclosure further provides a computer readable storage medium in which a computer program is stored is provided. The steps of the dispatching method according to any one of the aforementioned embodiments are implemented when the program is executed by a processor.

Those skilled in the art will appreciate that the embodiments of the present disclosure may be provided as a method, system, or computer program product. Accordingly, the present disclosure may take the form of an entirely hardware embodiment, an entirely software embodiment, or a combination of software and hardware aspects. Moreover, the present disclosure may take the form of a computer program product embodied in one or more computer-usable non-transitory storage media (including but not limited to disk memory, CD-ROM, optical memory, and the like) containing computer usable program codes therein.

The present disclosure is described with reference to the flow charts and/or block diagrams of methods, devices (systems), and computer program products according to the embodiments of the present disclosure. It will be understood that each step and/or block of the flow charts and/or block diagrams as well as a combination of steps and/or blocks of the flow charts and/or block diagrams may be implemented by a computer program instruction. These computer program instructions may be provided to a processor of a general purpose computer, special purpose computer, an embedded processing machine, or other programmable data processing devices to produce a machine, such that the instructions executed by a processor of a computer or other programmable data processing devices produce a device for realizing a function designated in one or more steps of a flow chart and/or one or more blocks in a block diagram.

These computer program instructions may also be stored in a computer readable memory that can guide a computer or other programmable data processing device to operate in a particular manner, such that the instructions stored in the computer readable memory produce a manufacture including an instruction device. The instruction device realizes a function designated in one or more steps in a flow chart or one or more blocks in a block diagram.

These computer program instructions may also be loaded onto a computer or other programmable data processing devices, such that a series of operational steps are performed on a computer or other programmable device to produce a computer-implemented processing, such that the instructions executed on a computer or other programmable devices provide steps for realizing a function designated in one or more steps of the flow chart and/or one or more blocks in the block diagram.

The above descriptions are only the preferred embodiments of the present disclosure, but do not serve to limit the present disclosure. Any amendment, equivalent replacement, improvement, and the like made within the spirit and principles of the present disclosure should all be contained within the protection scope of the present disclosure.

What is claimed is:

1. A dispatching method, comprising:
obtaining path condition information within a warehouse;
calculating a pickup time of each candidate robot of a plurality of candidate robots according to a location of the candidate robot and the path condition information, wherein the pickup time of the candidate robot is a time required for the candidate robot to arrive at a pickup location to pick up a cargo and reach a designated target location to complete a pickup task, and the pickup time is obtained by adding an additional pickup time for addressing a path problem to a base pickup time of the candidate robot by walking;
dispatching a target robot with a shortest pickup time to perform the pickup task according to the pickup time of each candidate robot,
wherein the additional pickup time is determined according to the following method:
calculating a first time by dividing an increased distance to bypass an obstacle path segment or a congestion path segment by the candidate robot by a base walking speed of the candidate robot, determining an increased turning time to bypass the obstacle path segment or the congestion path segment as a second time, and determining the additional pickup time of the candidate robot from the first time and the second time, when the path condition information includes obstacle information or congestion information on the shortest path.

2. The dispatching method according to claim 1, wherein the step of calculating the pickup time of each candidate robot of the plurality of candidate robots according to the location of the candidate robot and the path condition information further comprises:
selecting a pickup path of each candidate robot according to the location of the candidate robot and the path condition information; and
calculating the pickup time of the candidate robot according to a length of the pickup path and the base walking speed of the candidate robot.

3. The dispatching method according to claim 2, wherein the path condition information includes at least one of travel direction information, obstacle information, or congestion information of a path; and
the method further comprises selecting a path as the pickup path of the candidate robot from at least one kind of the following paths:
a path by which a travel direction meets the accessibility from the location of the candidate robot to a pickup location;
a path without obstacles from the location of the candidate robot to a pickup location; and
a path without a condition of congestion from the location of the candidate robot to a pickup location.

4. The dispatching method according to claim 1, wherein the step of calculating the pickup time of each candidate robot of the plurality of candidate robots according to the location of the candidate robot and the path condition information further comprises:
calculating the base pickup time of the candidate robot to travel each path of at least one path to complete the pickup task according to a length of the each path and the base walking speed of the candidate robot;
calculating the additional pickup time of the candidate robot to address the path problem in the each path according to the path condition information;
adding the base pickup time to the additional pickup time in the each path to obtain a total pickup time for the candidate robot in the each path, and selecting a shortest total pickup time from the total pickup time of the candidate robot in the each path as the pickup time of the candidate robot.

5. The dispatching method according to claim 1, wherein the step of calculating the pickup time of each candidate robot of the plurality of candidate robots according to the location of the candidate robot and the path condition information further comprises:
   selecting the shortest path of at least one path for the candidate robot to complete the pickup task;
   calculating the base pickup time of the candidate robot to travel the shortest path according to a length of the shortest path and the base walking speed of the candidate robot;
   calculating the additional pickup time of the candidate robot to address the path problem in the shortest path according to the path condition information; and
   adding the base pickup time of the candidate robot in the shortest path to the additional pickup time of the candidate robot in the shortest path to obtain the pickup time of the candidate robot.

6. The dispatching method according to claim 5, wherein the step of calculating the additional pickup time of the candidate robot to address the path problem in the shortest path according to the path condition information further comprises obtaining a time to clear obstacles in the shortest path as the additional pickup time of the candidate robot in the shortest path, when the path condition information includes obstacle information of the shortest path.

7. The dispatching method according to claim 1, wherein
   each of the candidate robots obtains the path condition information within the warehouse;
   each candidate robot calculates the pickup time according to the location and the path condition information; and
   a console dispatches the target robot to perform the pickup task from the pickup time reported by each candidate robot.

8. The dispatching method according to claim 7, wherein the console selects the target robot having the shortest pickup time to perform the pickup task from those candidate robots that report their pickup time within a first preset time after the console sends an instruction to the plurality of candidate robots to report their pickup time.

9. The dispatching method according to claim 7, wherein the console sends a dispatching instruction to the target robot, and determines a robot to perform the pickup task from the remaining robots, when the console does not receive confirmation information from the target robot within a second preset time.

10. The dispatching method according to claim 7, wherein the method further comprises:
    calculating, by the console, a length of the shortest pickup path of each of the candidate robots to complete the pickup task according to the location of the each candidate robot; and
    selecting, by the console, a preset number of robots from the candidate robots according to a length of the shortest pickup path of each candidate robot, and sending the path condition information within the warehouse to the preset number of robots.

11. A dispatching device, wherein the dispatching device comprises:
    one or more processors; and
    a memory coupled to the one or more processors and storing instructions that when executed by the one or more processors, cause the one or more processors to perform one or more operations including:
    obtaining path condition information within a warehouse;
    calculating a pickup time of each candidate robot of a plurality of candidate robots according to a location of the candidate robot and the path condition information, wherein the pickup time of the candidate robot is a time required for the candidate robot to arrive at a pickup location to pick up a cargo and reach a designated target location to complete a pickup task, and the pickup time is obtained by adding an additional pickup time for addressing a path problem to a base pickup time of the candidate robot by walking;
    dispatching a target robot with a shortest pickup time to perform the pickup task according to the pickup time of each candidate robot,
    wherein the additional pickup time is determined according to the following method:
    calculating a first time by dividing an increased distance to bypass an obstacle path segment or a congestion path segment by the candidate robot by a base walking speed of the candidate robot, determining an increased turning time to bypass the obstacle path segment or the congestion path segment as a second time, and determining the additional pickup time of the candidate robot from the first time and the second time, when the path condition information includes obstacle information or congestion information on the shortest path.

12. The dispatching device according to claim 11, wherein the step of calculating the pickup time of each candidate robot of the plurality of candidate robots according to the location of the candidate robot and the path condition information further comprises:
    selecting a pickup path of each candidate robot according to the location of the candidate robot and the path condition information; and
    calculating the pickup time of the candidate robot according to a length of the pickup path and the base walking speed of the candidate robot.

13. The dispatching device according to claim 12, wherein the path condition information includes at least one of travel direction information, obstacle information, or congestion information of a path; and
    the method further comprises selecting a path as the pickup path of the candidate robot from at least one kind of the following paths:
    a path by which a travel direction meets the accessibility from the location of the candidate robot to a pickup location;
    a path without obstacles from the location of the candidate robot to a pickup location; and
    a path without a condition of congestion from the location of the candidate robot to a pickup location.

14. The dispatching device according to claim 11, wherein the step of calculating the pickup time of each candidate robot of the plurality of candidate robots according to the location of the candidate robot and the path condition information further comprises:
    calculating the base pickup time of the candidate robot to travel each path of at least one path to complete the pickup task according to a length of the each path and the base walking speed of the candidate robot;
    calculating the additional pickup time of the candidate robot to address the path problem in the each path according to the path condition information;
    adding the base pickup time to the additional pickup time in the each path to obtain total pickup time for the candidate robot in the each path, and selecting a shortest total pickup time from the total pickup time of the candidate robot in the each path as the pickup time of the candidate robot.

15. The dispatching device according to claim 11, wherein the step of calculating pickup time of each candidate robot of the plurality of candidate robots according to the location of the candidate robot and the path condition information further comprises:
 selecting the shortest path of at least one path for the candidate robot to complete the pickup task;
 calculating the base pickup time of the candidate robot to travel the shortest path according to a length of the shortest path and the base walking speed of the candidate robot;
 calculating the additional pickup time of the candidate robot to address the path problem in the shortest path according to the path condition information; and
 adding the base pickup time of the candidate robot in the shortest path to the additional pickup time of the candidate robot in the shortest path to obtain the pickup time of the candidate robot.

16. The dispatching device according to claim 15, wherein the step of calculating the additional pickup time of the candidate robot to address the path problem in the shortest path according to the path condition information further comprises:
 obtaining a time to clear obstacles in the shortest path as the additional pickup time of the candidate robot in the shortest path, when the path condition information includes obstacle information of the shortest path.

17. The dispatching device according to claim 11, wherein first processing circuitry disposed within the candidate robot is configured to:
 obtain the path condition information within the warehouse; and
 calculate the pickup time according to the location and the path condition information; and
 second processing circuitry disposed within a console is configured to dispatch the target robot to perform the pickup task from the pickup time reported by the candidate robot.

18. The dispatching device according to claim 17, wherein the second processing circuitry disposed within the console is further configured to select the target robot having the shortest pickup time to perform the pickup task from those candidate robots that report their pickup time within a first preset time after the console sends an instruction to the plurality of candidate robots to report their pickup time.

19. The dispatching device according to claim 17, wherein the second processing circuitry disposed within the console is further configured to:
 calculate a length of the shortest pickup path of each candidate robot of the plurality of candidate robots to complete the pickup task according to the location of the candidate robot; and
 select a preset number of robots from the plurality of candidate robots according to a length of the shortest pickup path of each candidate robot, and send the path condition information within the warehouse to the preset number of robots.

20. A non-transitory readable storage medium storing a computer program, that when executed by a processor, causes the processor to perform a method comprising:
 obtaining path condition information within a warehouse;
 calculating a pickup time of each candidate robot of a plurality of candidate robots according to a location of the candidate robot and the path condition information, wherein the pickup time of the candidate robot is a time required for the candidate robot to arrive at a pickup location to pick up a cargo and reach a designated target location to complete a pickup task, and the pickup time is obtained by adding an additional pickup time for addressing a path problem to a base pickup time of the candidate robot by walking;
 dispatching a target robot with a shortest pickup time to perform the pickup task according to the pickup time of each candidate robot,
 wherein the additional pickup time is determined according to the following method:
 calculating a first time by dividing an increased distance to bypass an obstacle path segment or a congestion path segment by the candidate robot by a base walking speed of the candidate robot, determining an increased turning time to bypass the obstacle path segment or the congestion path segment as a second time, and determining the additional pickup time of the candidate robot from the first time and the second time, when the path condition information includes obstacle information or congestion information on the shortest path.

* * * * *